United States Patent [19]

Johnson

[11] Patent Number: 4,692,969
[45] Date of Patent: Sep. 15, 1987

[54] WINDSHIELD ATTACHMENT CLIP

[76] Inventor: Roy S. Johnson, P.O. Box 2662, Lynnwood, Wash. 98036

[21] Appl. No.: 901,515

[22] Filed: Aug. 28, 1986

[51] Int. Cl.[4] ............................................. A44B 21/00
[52] U.S. Cl. ................................. 24/573; 24/265 C; 24/563; 296/136
[58] Field of Search ................. 24/573, 574, 580, 621, 24/562, 543, 563, 67.9, 305, 265 C; 296/136; 114/203

[56] References Cited

U.S. PATENT DOCUMENTS

| | | | |
|---|---|---|---|
| 494,825 | 4/1893 | Spicer | 24/573 |
| 893,517 | 7/1908 | Keller | 24/562 |
| 2,467,604 | 4/1949 | Tinnerman et al. | 24/563 |
| 2,479,825 | 8/1949 | Fleischhauer | 296/136 |
| 2,639,751 | 5/1953 | Flaherty | 296/136 |
| 2,664,309 | 12/1953 | Kavalar | 296/136 |
| 2,937,834 | 5/1960 | Orenick et al. | 24/573 |

FOREIGN PATENT DOCUMENTS 460985  11/1949  Canada ............................. 24/265 C Primary Examiner—Victor N. Sakran
Attorney, Agent, or Firm—Christensen, O'Connor, Johnson & Kindness

[57] ABSTRACT

Disclosed is a windshield attachment clip for securing a snap fastener component to an exposed edge of a boat windshield wherein the exposed edge of the windshield is covered with trim. The snap fastener component mates with a corresponding component affixed to a flexible boat cover. The attachment substantially covers the trim and is configured to resist forces tending to cause its slippage from the trim. The attachment is particularly configured to effectively distribute bending stresses imparted in it when the fastened cover is pulled.

7 Claims, 2 Drawing Figures

WINDSHIELD ATTACHMENT CLIP

BACKGROUND OF THE INVENTION

This invention relates to attachments for securing snap fastener components to the exposed edge of a boat windshield.

Many pleasure boats in use today have windshields that project upwardly from the gunwales and front deck. Often the exposed edge of the windshield is covered with a protective resilient trim. Most pleasure boats also have removable covers to protect the boat when it is not in use or during inclement weather. These covers, typically formed of flexible material such as canvas, are fastened to the exposed edge of the windshield. To this end, attachments are placed at spaced locations along the exposed edge of the windshield. Each attachment carries a conventional snap fastener component that mates with a corresponding component that is affixed to the cover.

The windshield attachments bear significant stresses each time the cover is attached to, or removed from, the windshield. Furthermore, since most flexible covers are designed to fit tautly when fastened, the windshield attachments are usually under some stress when the cover is in place. Accordingly, windshield attachments must be configured to withstand these stresses to avoid breakage, while remaining securely attached to the windshield.

SUMMARY OF THE INVENTION

This invention is directed to an attachment for securing a snap fastener component to the exposed edge of a boat's windshield. The snap fastener component mates with a corresponding component that is affixed to a flexible cover. The attachment formed in accordance with this invention is configured to withstand the stresses produced within it when the cover is fastened to or removed from windshield edge. Furthermore, the attachment is configured to securely clasp the trim of the windshield so that the attachment does not slip out of position as the cover is fastened or removed. The windshield attachment formed in accordance with this invention particularly includes a clip portion comprising a strip of substantially elastic material formed into a "U" shape, thereby having two legs extending from a base. The clip portion is configured to fit over the trim with the legs of the clip portion clasping the trim. A substantially flat extension piece is integrally formed with, and extends from, one of the legs. The extension piece carries the conventional snap fastener component.

As another aspect of this invention, the base of the clip portion is bowed inwardly. With this configuration, bending stresses that occur in the clip portion when the legs of the clip portion are flexed will be distributed over the base of the clip portion. The distribution reduces the concentration of bending stresses at the base/leg junction of the clip portion and therefore permits the attachment piece to resist substantial stresses before reaching its elastic limit.

BRIEF DESCRIPTION OF THE DRAWINGS

A better understanding of the invention can be derived by reading the ensuing specification in conjunction with the accompanying drawings wherein.

DETAILED DESCRIPTION OF THE PREFERRED EMBODIMENTS

Figures 1, 2:
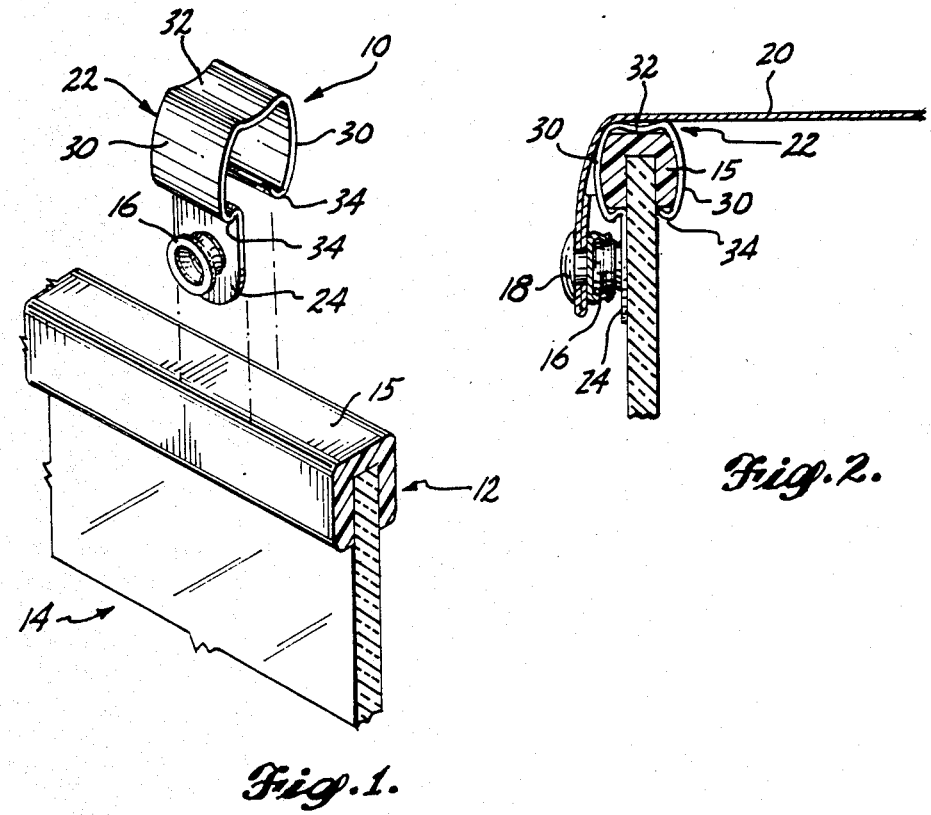
FIG. 1 is an isometric view of a windshield attachment formed in accordance with this invention.
FIG. 2 is a side view of the windshield attachment of FIG. 1 shown in position on the exposed edge of a windshield.

Referring to FIGS. 1 and 2, the preferred embodiment of the windshield attachment 10 formed in accordance with this invention is a rigid but elastic unitary article configured to clasp onto the exposed edge 12 of a boat's windshield 14. The exposed edge of the windshield is covered with a trim 15 that is usually formed of resilient material such as vinyl. The attachment 10 carries a conventional snap fastener component 16 for mating with a corresponding snap fastener component 18 affixed to a flexible cover 20. A plurality of attachments 10 are placed along the windshield edge at locations corresponding to the positions of the snap fastener components that are affixed to the cover. When in place, the cover 20 extends across the area defined by the windshield edge. This area usually extends over the passenger compartment of the boat.

More particularly, attachment 10 comprises a clip portion 22 and an integrally formed extension piece 24. The clip portion 22 is configured to snugly fit over the trim 15. The clip portion 22 is preferably a strip of stainless steel formed in a substantially "U" shape, thereby having two legs 30 extending from a base 32. The outer ends of the legs 30 are curled to define inwardly protruding lips 34.

The integrally formed flat extension piece 24 extends outwardly from the outer end of one leg 30 of the clip portion 22. The conventional snap fastener component 16 is riveted to the center of the extension piece 24.

To secure the attachment 10 to the exposed edge 12 of the windshield, the legs 30 of the clip portion 22 are forced apart and the clip portion is slipped over the trim 15. The lips 34 substantially enclose the bottom of the trim 15. Preferably, the cross-sectional area of the clip portion 22 is slightly smaller than a cross-sectional area of the trim 15 and the windshield edge it covers. Accordingly, when the legs 30 are released, the elasticity of the attachment causes the legs to snugly clasp the trim 15.

When the attachment 10 is properly positioned, the extension piece 24 lays flat against the portion of the windshield immediately below the trim 15. The secure the cover 20 to the windshield edge, the snap fastener component 18 that is affixed to the cover 20 is pressed against the snap fastener component 16 that is carried by the extension piece 24 of the attachment.

It can be appreciated that each time tension is applied to the snap fastener component 16, acting in the direction indicated by the arrow in FIG. 2, (for example, during attempts to unsnap a recalcitrant snap fastener, or when the attachments are used to secure a taut fitting cover), the attachment 10 is pulled upwardly from the edge of the windshield. However, because of the complete enclosure of the trim 15 by the base 32, legs 30, and protruding lips 34 of the clip portion, substantial resistance is offered against slippage of the attachment off the trim.

Each time the windshield attachment 10 is repositioned on the trim, or pulled as just described, the legs 30 of the clip portion 22 are forced apart, thereby creating bending stresses in the clip portion. These stresses concentrate in the region where the legs 30 join the base 32. In order to minimize this concentration of bending stresses, the base 32 of the attachment formed in accordance with this invention is bowed slightly inwardly. Such a configuration tends to distribute the bending stresses more evenly over the clip portion 22. That is, the concentration of the bending stresses at the leg/base junction will be less than what it otherwise would be if the base was substantially flat or bowed outwardly. Accordingly, with the inwardly bowed configuration of the base 32, the attachment 10 will withstand relatively greater bending forces applied to it before reaching its elastic limit than it could if the base was not so configured.

It will be understood that various changes in the details, materials and configuration of the attachment which has been herein described and illustrated in order to explain the nature of the invention may be made by those skilled in the art within the principal and scope of the invention as expressed in the appended claims.

The embodiments of the invention in which an exclusive property or privilege is claimed are defined as follows:

1. An attachment for securing a releasable snap fastener component at a selected point along an exposed edge of a windshield, wherein the exposed edge of the windshield carries trim substantially covering that edge, the attachment comprising:

(a) a clip portion comprising a strip of elastic material formed into a generally U-shaped configuration to thereby define two legs extending from a base, the base being bowed inwardly, and the legs being outwardly bowed to fit over and substantially cover the trim at the selected point along the windshield edge, and to be slidably adjustable thereon, with the legs of the clip portion clasping the trim; and (b) a substantially flat extension piece integrally formed with the extending from one of the legs, and releasable snap fastener component being attached to the extension piece.

2. The attachment of claim 1, wherein the ends of the legs that are located away from the base have inwardly protruding lips formed therein.

3. The attachment of claim 1, wherein the ends of the legs that are located away from the base have inwardly protruding lips formed therein.

4. The attachment of claim 3, wherein the base of the U-shaped clip portion is bowed inwardly.

5. The attachment of claim 4, wherein the extension piece extends from the inwardly protruding lips to rest flat against the windshield when the attachment is secured thereto.

6. The attachment of claim 5, wherein the releasable snap fastener component comprises the male component of a releasable button snap.

7. The attachment of claim 5, wherein the releasable snap fastener component comprises the female component of a releasable button snap.

* * * * *

UNITED STATES PATENT AND TRADEMARK OFFICE
CERTIFICATE OF CORRECTION

PATENT NO. : 4,692,969

DATED : September 15, 1987

INVENTOR(S) : Roy S. Johnson

It is certified that error appears in the above-identified patent and that said Letters Patent is hereby corrected as shown below:

Column 1, line 40: Insert --the-- before "windshield"

Column 2, line 47: "The" should be --To-- line 54: Delete "," (comma) after "2"

Column 4, line 8: "the" should be --and--
(Claim 1, line 16)

Signed and Sealed this

First Day of March, 1988

Attest:

DONALD J. QUIGG

*Attesting Officer*      *Commissioner of Patents and Trademarks*